United States Patent
Pearson (10) Patent No.: US 7,274,398 B2
(45) Date of Patent: Sep. 25, 2007

(54) AUTOBLANK READOUT MODE

(75) Inventor: Michael Pearson, Ottawa (CA)

(73) Assignee: Psion Teklogix Systems Inc., Mississauga, Ontario (CA)

( * ) Notice: Subject to any disclaimer, the term of this patent is extended or adjusted under 35 U.S.C. 154(b) by 753 days.

(21) Appl. No.: 10/146,231

(22) Filed: May 15, 2002

(65) Prior Publication Data
US 2002/0175954 A1 Nov. 28, 2002

Related U.S. Application Data

(60) Provisional application No. 60/290,964, filed on May 16, 2001.

(51) Int. Cl.
*H04N 5/335* (2006.01)

(52) U.S. Cl. ........................ 348/312; 348/295; 348/296

(58) Field of Classification Search ................ 348/312, 348/296, 298, 380, 295
See application file for complete search history.

(56) References Cited

U.S. PATENT DOCUMENTS

| | | | | |
|---|---|---|---|---|
| 5,541,654 | A * | 7/1996 | Roberts | 348/301 |
| 6,580,456 | B1 * | 6/2003 | Jacobs | 348/312 |
| 6,614,477 | B1 * | 9/2003 | Lee et al. | 348/312 |
| 6,977,685 | B1 * | 12/2005 | Acosta-Serafini et al. | 348/308 |

OTHER PUBLICATIONS

LM9627 Color CMOS Image Sensor VGA 30 FPS, National Semiconductor Corporation, Mar. 2001, pp. 1-37.

* cited by examiner

*Primary Examiner*—Lin Ye
(74) *Attorney, Agent, or Firm*—Pearne & Gordon LLP (57) ABSTRACT

The present invention implements an automated blank time function, which calculates a horizontal and/or a vertical blank time for a desired integration time and window size. Input data and control signals for predetermined integration time and window size are provided to a register interface, which generates configuration signals. The configuration signals are applied to machines, which generate reset control signals and read control signals from the configuration signals for controlling the imager.

26 Claims, 6 Drawing Sheets

AUTOBLANK READOUT MODE

This application claims the benefit of U.S. Provisional Patent Application Ser. No. 60/290,964 filed on May 16, 2001.

FIELD OF THE INVENTION

The present invention relates to electronic imaging devices, such as CCD and CMOS imagers, and is directed more particularly to the user-controlled interface of such devices.

BACKGROUND OF THE INVENTION

In any type of image capture system that uses the rolling shutter technique to capture video images there is a fundamental limitation on the maximum exposure time. In rolling shutter image acquisition, the row Reset and Read sequences need to increment through the frame at the same rate in order to preserve a constant integration/exposure time on a row-by-row basis. If the integration time is larger than the frame readout time, the row Reset sequence can wrap around to the first row before the Read sequence for that row has begun, thereby destroying the proper image information.

Figure 1:
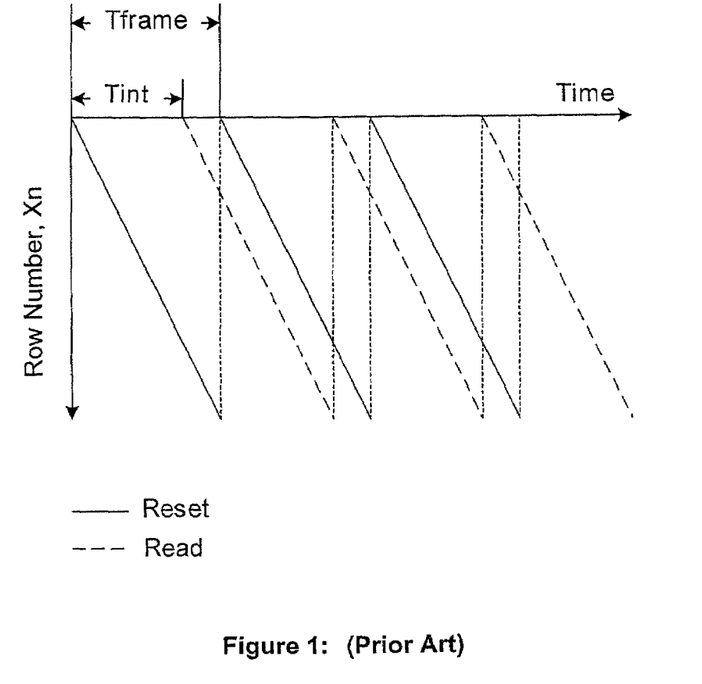
FIG. 1 is a typical timing diagram illustrating a rolling shutter in operation.

FIG. 1 is a simplified illustration of the Reset and Read sequence in rolling shutter, where the horizontal axis represents time, and the vertical axis represents the row number.

Figure 2:
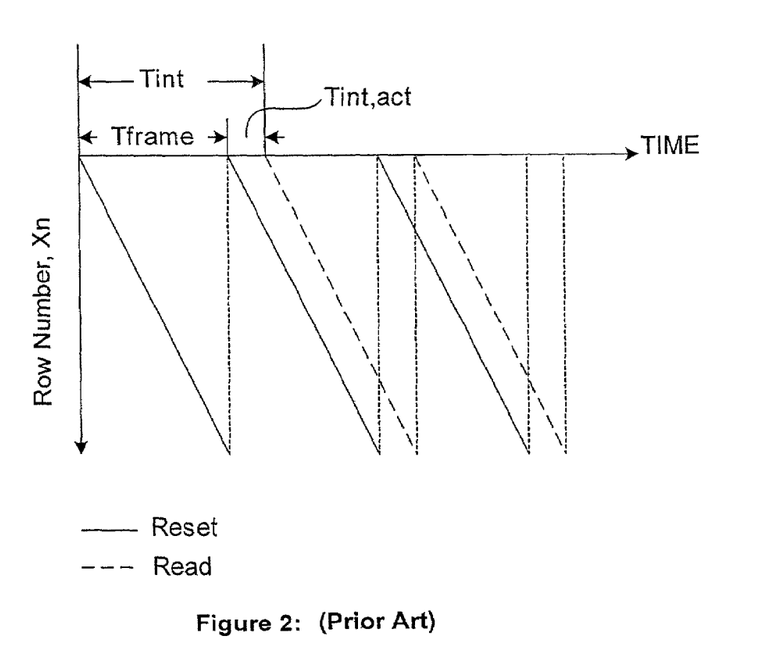
FIG. 2 is a typical timing diagram illustrating a rolling shutter where the integration time is greater than the frame time.
Figure 6:
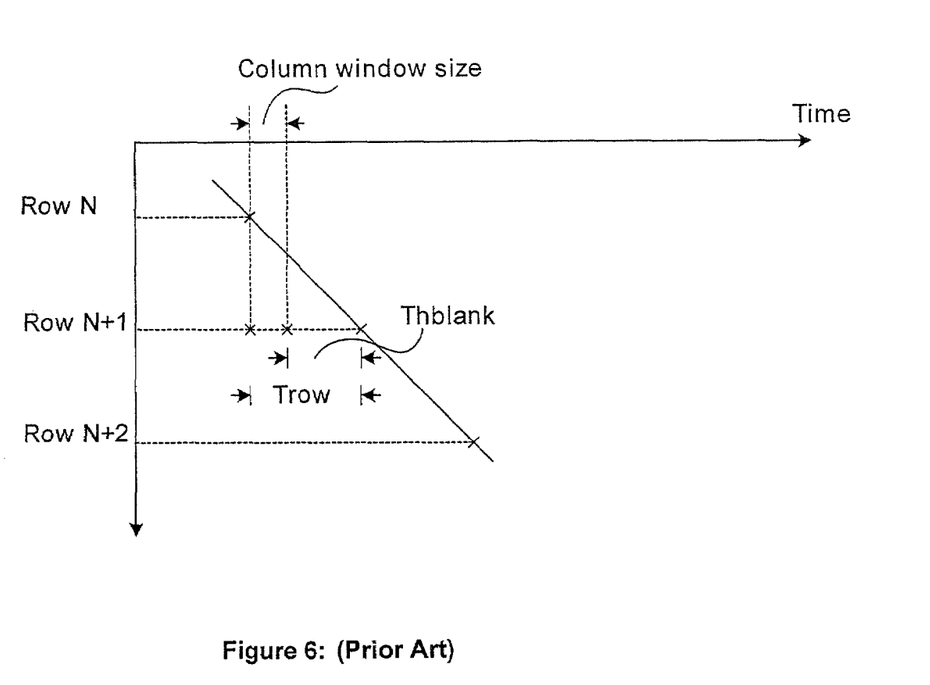
FIG. 6 is a typical timing diagram illustrating the operation of a rolling shutter at the row activation level.

If the Read sequence is moved to the left on the time axis, integration time is decreased, and increased if moved to the right. However, if the Read sequence is moved too far along to the right of the time axis, such that $T_{int} > T_{frame}$, the Reset sequence repeats prior to reading, destroying the original frame information. This yields an actual integration time of $T_{int,\ act} = T_{int} - T_{frame}$ as shown in FIG. 2. Also, if the row or column frame size is decreased, $T_{frame}$ and the maximum integration time will also be decreased. As the column window size, illustrated in FIG. 6, is increased, the slope ΔRow Number/ΔTime decreases, which in turn increases the frame time $T_{frame}$. Likewise, decreasing the column window size increases the slope, which decreases the frame time. Therefore, the smaller the window size the smaller the maximum available integration time.

Figure 3:
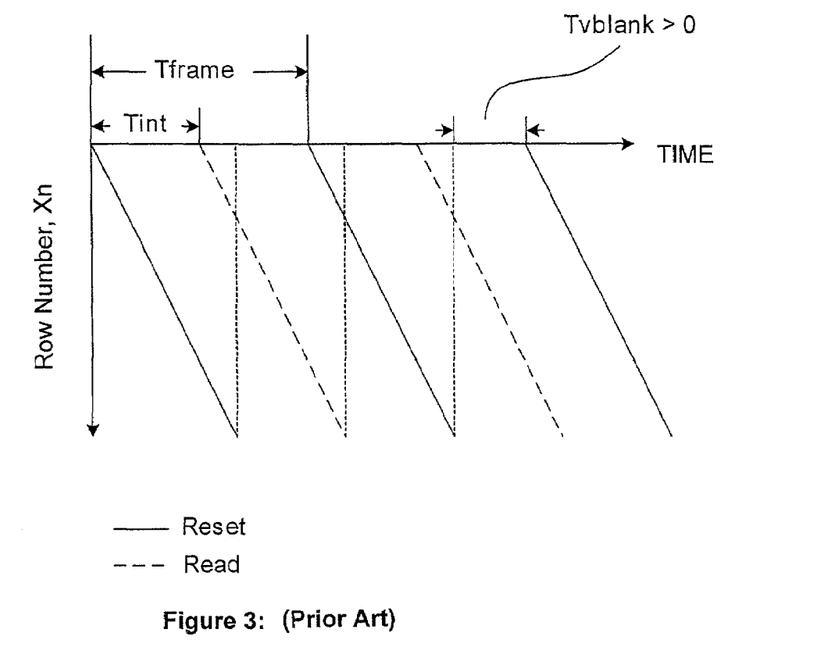
FIG. 3 is a typical timing diagram illustrating a rolling shutter with a non-zero vertical blank time.

A non-zero vertical blank time $T_{vblank}$, consists of a time-delay inserted between the end of the current reset sequence and the initiation of a new reset sequence. This will produce a delay between consecutive frames as shown in FIG. 3.

Figure 4:
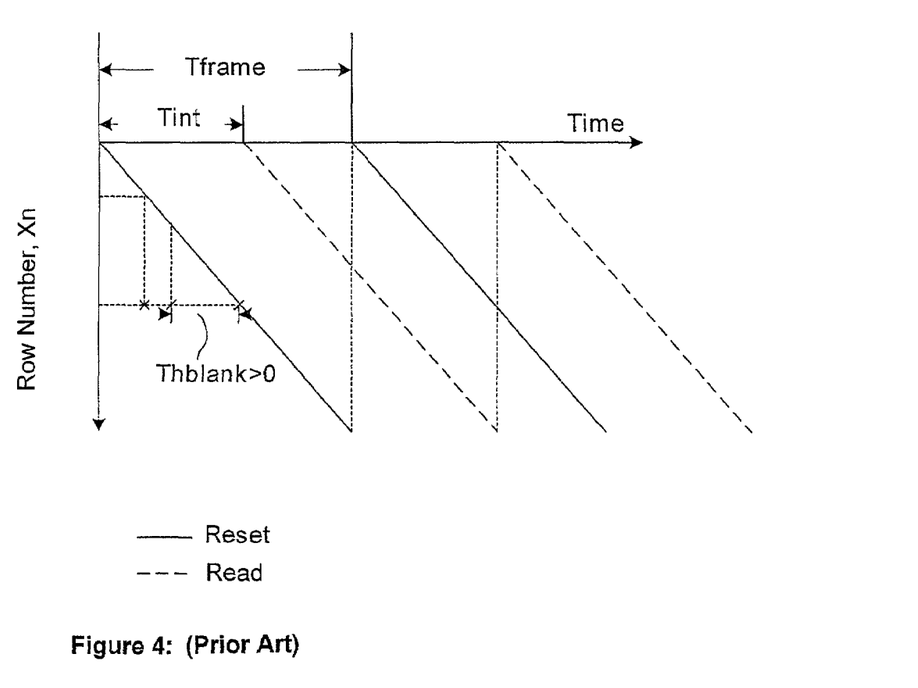
FIG. 4 is a typical timing diagram illustrating a rolling shutter with a non-zero horizontal blank time.

A non-zero horizontal blank time $T_{hblank}$, consists of a time-delay inserted between the end of the reset sequence for a particular row number, and the initiation of the reset sequence in the next subsequent row. This will decrease the slope- ΔRow Number/ΔTime as shown in FIG. 4. Increasing either $T_{hblank}$ or $T_{vblank}$ will increase the frame time $T_{frame}$ thereby increasing the maximum integration time $T_{int}$.

Maximizing the integration time $T_{int}$ for small window sizes can be quite complicated, since many calculations may be required. However, one solution is to capture one frame at a time or just set the horizontal $T_{hblank}$ and vertical blank $T_{vblank}$ times to large values. Since many applications require high frame rates, both these solutions are undesirable and not very flexible.

Figure 5:
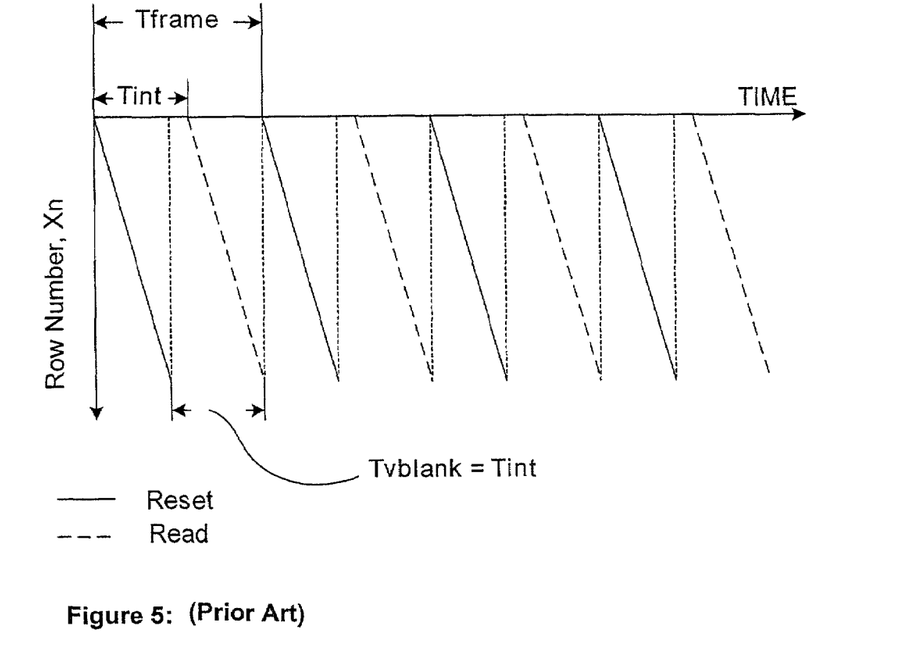
FIG. 5 is a typical timing diagram illustrating a rolling shutter with a vertical blank time equal to the integration time.

There are a few simple solutions already known in the art, as can be demonstrated from the data sheet for the LM9627 Color CMOS Image Sensor VGA 30 FPS imager, produced by National Semiconductor, which is incorporated herein by reference. In this system, the user must select values for the various time delays and variables which affect the operation of the imager. The simplified description of this method is to insert a vertical blank time $T_{vblank}$ equal to the integration time $T_{int}$ before the Reset and Read sequence repeats. This is illustrated in FIG. 5. Because a blank time $T_{vblank}$ equal to the integration time $T_{int}$ is inserted between frames, the problem of the Reset "wrap-around" prior to the row Read is completely eliminated and the imaging cycle will get the proper integration time no matter what the window size is.

Usually, the user determines the integration time that is desired and can calculate the additional values, or use a look up table to find the appropriate values and then enter them into the imager's memory.

The equation used to calculate these values is generally understood to be:

$$T_{int} < [(\Delta_{Col} * T_{col}) + T_{row\_blank} + T_{hblank}] * \Delta_{Row} + T_{vblank}$$

$T_{col}$ is the period at which a column or columns are read out $T_{row\_blank}$ is defined generally here as the delay time from sampling and latency in the imager, it is related to the time that it would take to do a single read, and other similar delay times. The $\Delta_{Col}$ value means the number of columns that a particular window size will use, as the window size varies the $\Delta_{Col}$ value will change accordingly. The $\Delta_{Row}$ value is the number of rows that a particular window size will use; as the window size varies the $\Delta_{Row}$ value will change accordingly. The horizontal blank time, $T_{hblank}$, and the vertical blank time, $T_{vblank}$, are defined values that are entered into the imager and will vary depending on the desired settings the user wishes to accomplish, both in terms of integration time $T_{int}$, and other settings. In order for a user to determine an appropriate integration time for a particular window size ($\Delta_{Col}$ and $\Delta_{Row}$) the $T_{vblank}$, and $T_{hblank}$ times have to be adjusted in order to create the appropriate environment for the image to be captured, optimization is often difficult. As can be seen from the above equation, four variables must be adjusted and optimized for changing window sizes.

These methods are both time consuming and require an intimate knowledge of the imager's functionality. It is apparent from this that an automatic blanking time mode needs to be developed which will allow the user and controlling software to have an simple way to adjust the blanking time or the frame readout time, without performing any calculation or manually entering a number of controlling variables.

Therefore, there is a need for apparatus and a method of automatically setting vertical and horizontal blanking times for a selected integration time and window size.

SUMMARY OF THE INVENTION

The invention is directed to a method and apparatus for implementing an automated blank time function, which calculates a horizontal and/or avertical blank time for a desired integration time and window size. The method comprises providing input data and control signals for predetermined integration time and window size for autoblank mode, generating configuration signals from the input signals, and generating reset control signals and read control signals from the configuration signals for controlling the imager. Autoblank mode is used to represent automatic blank time mode. The method may further include producing reset counter values to control the reset cycle and read counter values to control the read cycle, as well as a signal for synchronizing the read control signals and the reset control signals.

The apparatus comprises a register interface for receiving input data and control signals for a predetermined integration time and window size and for generating configuration signals from the input signals. The apparatus further includes a device for generating reset control signals and read control signals from the configuration signals for controlling the imager.

In accordance with an aspect of the invention, the device for generating reset control signals and read control signals comprises finite state machines wherein a reset finite state machine produces reset control signals in response to configuration signals, and a read finite state machine produces read control signals in response to the configuration signals. The reset finite state machine may produce the reset control signals, reset counter values to control the reset cycle, whereas the read finite state machine may produce the read control signals and counter values to control the read cycle. Further a signal is generated to synchronize the reset and the read finite state machines.

In accordance with another aspect of the invention, the method for controlling an imager by automatically setting vertical and horizontal blank times for a selected integration time and window size is stored on a computer readable memory element as instructions or statements for use in its execution in a computer.

With regard to another aspect of the invention, $$T_{int} < [(\Delta_{Col} * T_{Col}) + T_{row\_blank} + T_{hblank}] * \Delta_{Row} + T_{vblank},$$

where:
$T_{int}$ is the integration time,
$T_{col}$ is the period at which a column or columns are read out,
$T_{row\_blank}$ is the delay time from sampling and latency for a single read,
$T_{hblank}$ is the horizontal blank time,
$T_{vblank}$ is the vertical blank time,
$\Delta_{Col}$ is the number of columns for a predetermined window size, and
$\Delta_{Row}$ is the number of rows for a predetermined window size;

and frame time may be minimized by setting:
an optimal $T_{vblank}$ for a fixed $T_{hblank}$, or
an optimal $T_{hblank}$ for a fixed $T_{vblank}$, or
optimal $T_{vblank}$ and $T_{hblank}$.

In accordance with another aspect of this invention, $T_{vblank} = T_{int}$.

In accordance with a further aspect of this invention, $T_{int}$ is smaller then but very nearly equal to $\{[(\Delta_{Col} * T_{Col}) + T_{row\_blank} + T_{hblank}] * \Delta_{Row} + T_{vblank}\}$ minimize frame time.

Other aspects and advantages of the invention, as well as the structure and operation of various embodiments of the invention, will become apparent to those ordinarily skilled in the art upon review of the following description of the invention in conjunction with the accompanying drawings.

BRIEF DESCRIPTION OF THE DRAWINGS

The invention will be described with reference to the accompanying drawings, wherein.

DETAILED DESCRIPTION OF THE INVENTION

In the preferred embodiment of the present invention, a register is placed on an imager chip and is programmed with values that represent the activation of an automatic blank mode, as well as some register values, which would embody the exposure control.

Figure 7:
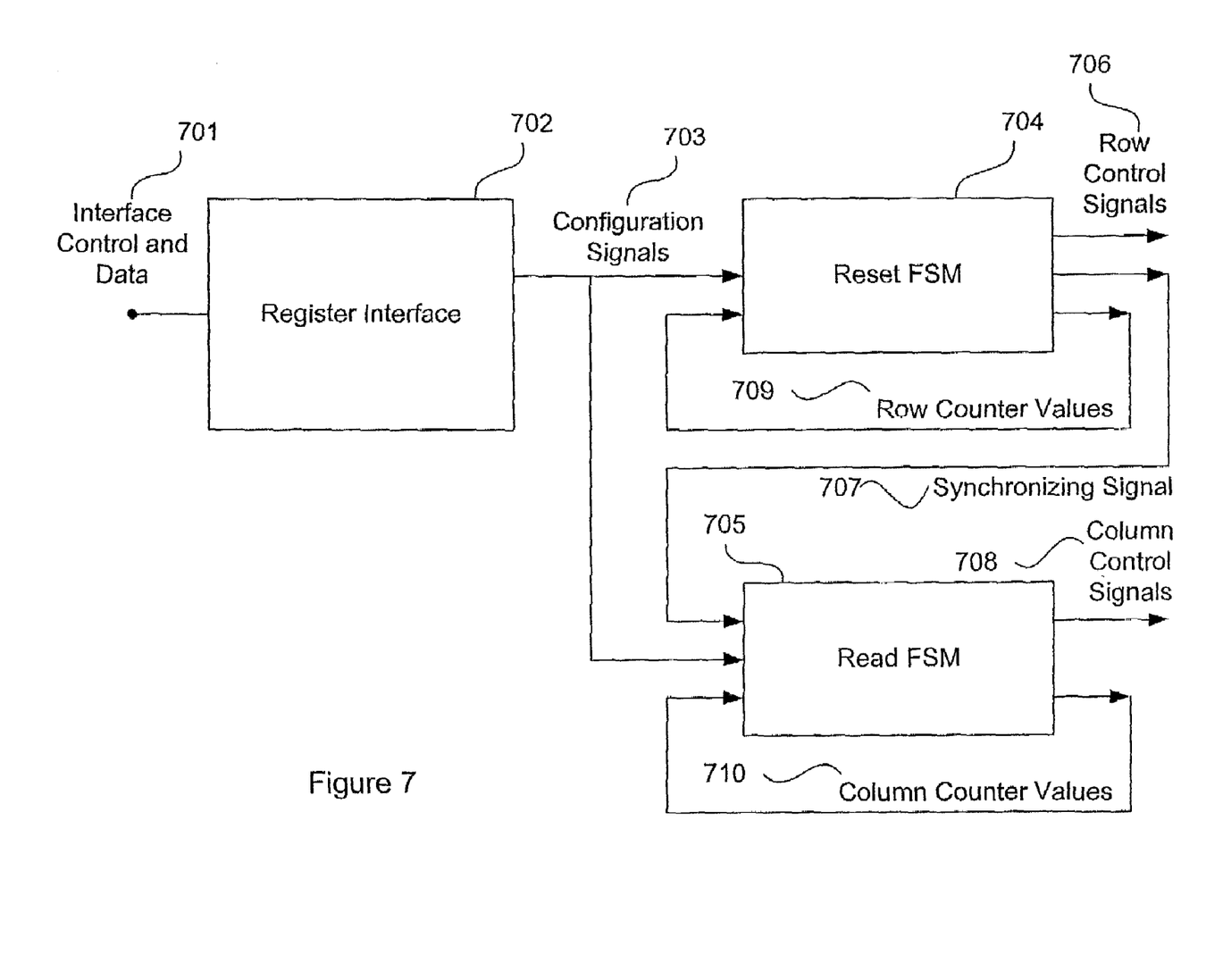
FIG. 7 is a block diagram illustrating a preferred implementation of the present invention.

Referring to FIG. 7, a preferred embodiment of the current invention is illustrated using a series of decision-making blocks, that could be implemented on or off chip, in a electronic circuit or programmed into a computer that interfaced with the decoding circuitry. The manner in which these decision making blocks are programmed will not be described in detail since one skilled in the art could create blocks which would perform the tasks that are associated with each block in a manner that is well known in the art. This invention is shown to be implemented by having the user or interface computer set configuration signal bit or bits 703 that relate to the desired setting for the imager, internal or external to the imaging chip, by means of a register interface 702. The register 702 receives interface signals 701 such as a series of register addresses, data and control signals 701. These configuration signals 703 are then inputted to control circuitry including a system of Finite State Machines (FSM) and supporting circuitry, so that the row RESET or access cycle waits a full integration period to wrap around to the beginning of the frame. The Reset FSM 704 controls the RESET sequence and synchronizes the Read FSM 705 and the Read FSM 705 controls the row READ access signals as well as column sampling signals. Specifically, as illustrated in FIG. 7, the configuration signals 703 are coupled to both the Reset FSM 704 as well as the Read FSM 705. The Reset FSM 704 outputs a set of Reset Control Signals 706 which control the imaging array, a Read FSM 705 synchronizing signal 707 which is operatively coupled to the Read FSM 705, as Reset Counter Values 709, which keep track of the reset cycle. The Read FSM 705 is synchronized with the Reset FSM 704 through the Read FSM Synchronizing signal 707. The Read FSM 705 outputs Read Control Signals 708 to the imaging array, as well as Read Counter Values 710, which keep track of the row read cycle and the column sampling. The Reset Control Signals 706 consist of a sequence of row reset signals as needed. The Read Control signals 708 are simply the controlling signals, which activate both the column and row read sequences.

Figure 8:
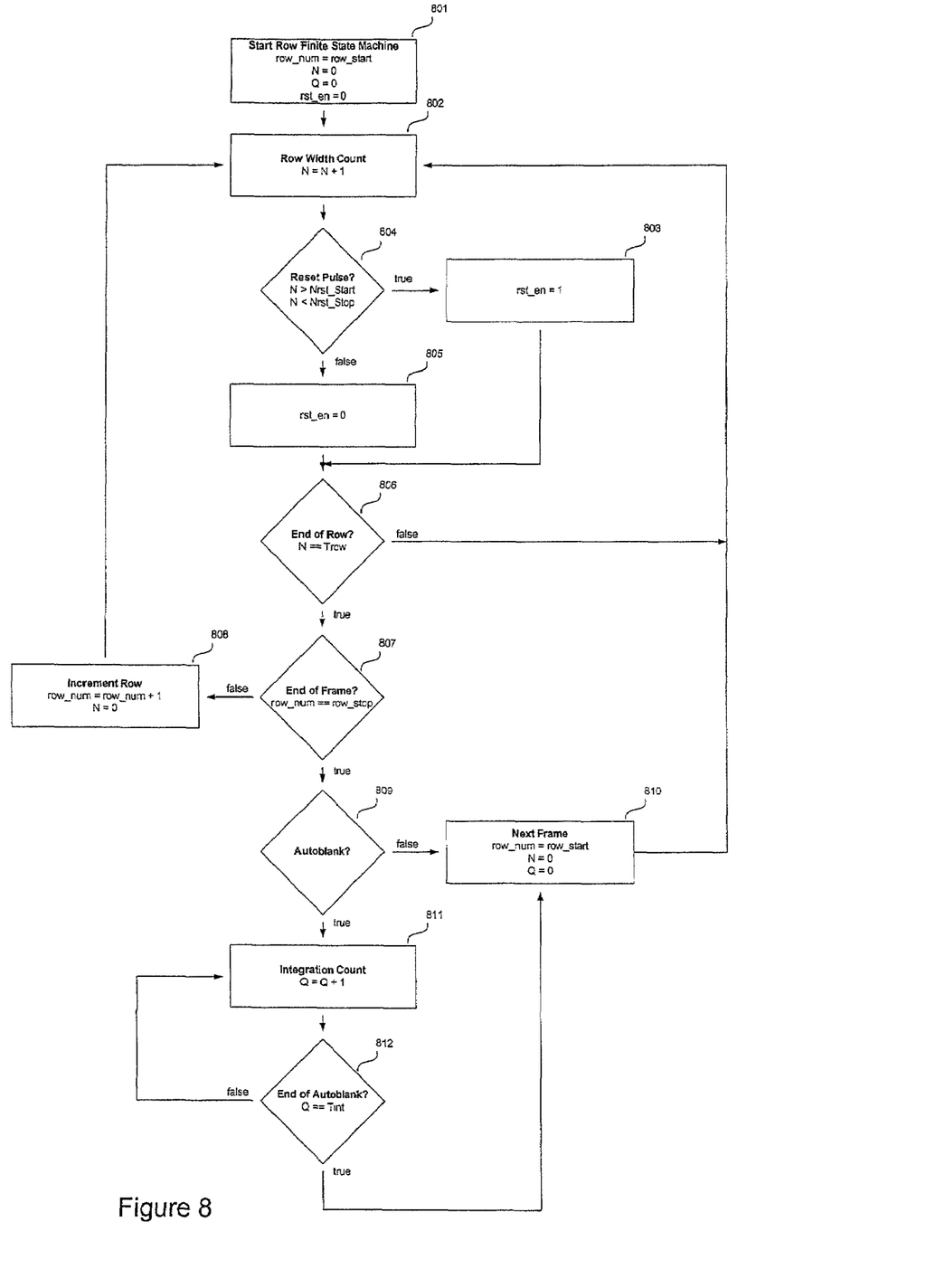
FIG. 8 is a block diagram illustrating the flow chart for the Reset Finite State Machine of a preferred implementation of the present invention.
Figure 9:
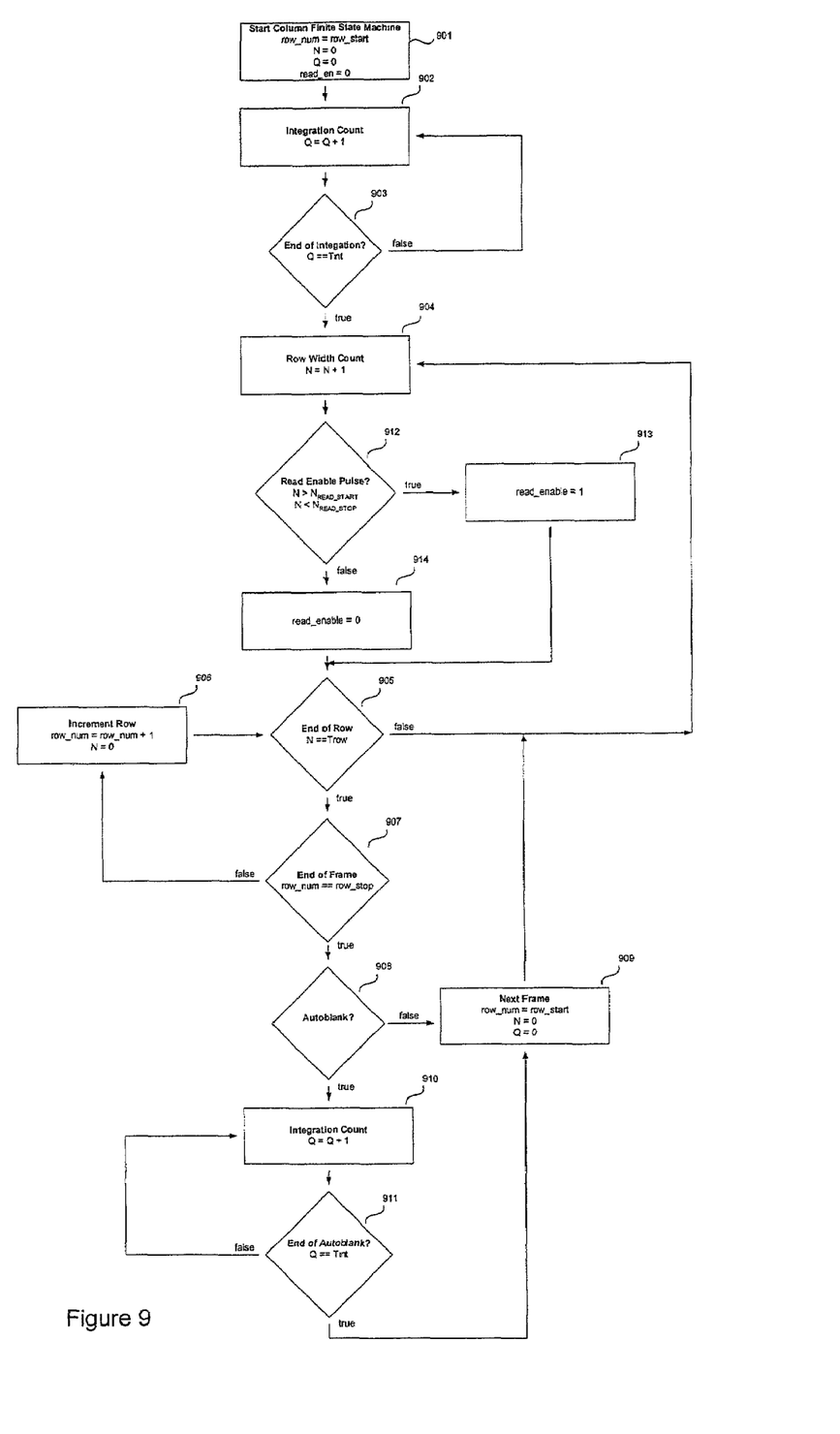
FIG. 9 is a block diagram illustrating the flow chart for the Read Finite State Machine of a preferred implementation of the present invention.

The preferred algorithm to program into either a combination of the Reset FSM 704, and Read FSM 705, or a single FSM which performs the tasks assigned to the Reset and Read FSMs, are illustrated in FIG. 8 and FIG. 9 respectively.

The Reset Finite State Machine 704 algorithm is illustrated in FIG. 8. The system is initialized 801, the current row number (row_num) is set to a system defined starting row number, this is dependent on the window size that is defined by the user, and the window of pixels that is being used in the array. The number of clocks cycles between consecutive row resets (N) is set to 0, the number of clock cycles for the integration period or the number of cycles between the end of a given row's reset and the beginning of that row's read (Q) is set to zero and the reset enable pulse (rst_en) is set to a low or an inactive value. The system defined start of the reset pulse ($N_{RST\_START}$) and end of the reset pulse ($N_{RST\_STOP}$) are set to their defined values. The length of time spend on a particular row is defined by $T_{Row}$, this is defined by the user/system. The integration time $T_{int}$ between reset and readout is also defined.

The system then holds the current row number valid, and increments the N value 802. Then the algorithm evaluates if a reset pulse should be initiated 804 by comparing N, to the $N_{RST\_START}$ and $N_{RST\_STOP}$. If N is larger than $N_{RST\_START}$, but smaller than $N_{RST\_STOP}$, it finds the condition true and places rst_en equal to a high or active value 803 and advances to block 806, if false then it places rst_en at a low value 805 and cycles through to the next question 806.

In block 806, the algorithm evaluates whether it has reached the end of the clock cycles that should be spent on a particular row. If false then it proceeds to increase the N count 802. If true then it evaluates whether it has reached the end of a particular frame 807, frame generally being understood in the art as the number of rows, defined by the row window size, that will be read by the system.

If the system finds that the frame has ended, then if examines the autoblank setting, to determine if autoblank mode is activated 809. If true, then it increases the integration count, by incrementing Q 811. If false, then the system proceeds into the next frame 810 by reinitializing the current variables to their initial settings as in 801.

After the integration count is incremented 811, the system compares the current Q value to the system defined $T_{int}$ value 812. If it has then it initiates the new frame by moving to block 810. If not, then it proceeds to the 811 block and increments the Q value.

This algorithm works in conjunction with the Read Finite State Machine 705 as defined in FIG. 9, as long as the rolling shutter is active. A synchronization signal is sent between the Reset Finite State Machine 704 and the Read Finite State Machine 705 in order to ensure that both start at the same time, the variables in each algorithm are local variables distinct to each machine.

FIG. 9 shows the Read Finite State Machine 705 algorithm in more detail. There is an initialization block 901, which defines the current row number (row_num) as being set to a system defined starting row number, this is dependent on the window size that is defined by the user, and the window of pixels that is being used in the array. The number of clocks cycles between valid row addresses (N) is set to 0, the number of clock cycles between the end of the valid row address and the integration of the same row (Q) is set to 0 and the read enable pulse (read_enable) is set to low or an inactive value. The system-defined start of the read pulse ($N_{READ\_START}$) and end of the read pulse ($N_{READ\_STOP}$) are set to their defined values. The length of time spend on a particular row is defined by $T_{Row}$, this is defined by the user/system. The integration time between reset and readout $T_{int}$ is also defined.

The algorithm is set to monitor the integration count 902. It does this by incrementing the integration count 902 as it evaluates the count as compared to the defined integration time $T_{int}$ 903. These steps offset the row reset and the row read cycles producing the desired integration time. The synchronization is performed by starting 801 on FIG. 8 at the same time as 901 in FIG. 9. This can be achieved via a synchronization signal.

When the integration time $T_{int}$ is reached, the algorithm begins to proceed through the read of the pixels. The row access time is monitored 904, and then the algorithm checks to see if a read enable pulse should be generated by comparing the current clock cycle (N) to the predefined start and stop times for the Read Enable pulse 912. If this is true, then the algorithm places the read_enable signal high 913, if false then the read_enable is kept low 914.

Then the algorithm compares the N value to the end of row value 905. If false then it checks to it returns to the Row Width Count level 904. If true, then it checks to see if the frame has ended by comparing the row number to the row stop number 907, if false then it increments the row number 906, and returns to the End of Row level 905. If true, then it checks the autoblank register 908 to see if autoblank mode has been activated. If false then it moves to the next frame 909, if true then it increases the integration count 910, until it reaches the predefined integration time $T_{int}$ 911, at which point it moves to the next frame 909.

The method presented above, namely inserting a vertical blank time equal to the integration time, will not produce a minimal frame time. Therefore, a more optimal method for implementing an automated blank time function would be to calculate the minimum horizontal or vertical blank time for a desired integration time or window size. This will solve the Reset "wrap around" effect, as well as providing a much faster frame time.

While the invention has been described according to what is presently considered to be the most practical and preferred embodiments, it must be understood that the invention is not limited to the disclosed embodiments. Those ordinarily skilled in the art will understand that various modifications and equivalent structures and functions may be made without departing from the spirit and scope of the invention as defined in the claims. Therefore, the invention as defined in the claims must be accorded the broadest possible interpretation so as to encompass all such modifications and equivalent structures and functions.

What is claimed is:

1. A method of controlling an imager by automatically setting horizontal blank time for a selected integration time and window size comprising:
   providing a selected integration time and window size;
   setting a vertical blank time equal to the integration time;
   calculating the horizontal blank time for the selected integration time or window size using the imager;
   generating configuration signals automatically from the selected integration time, window size, calculated horizontal blank time, and set vertical blank time; and
   generating reset control signals and read control signals from the configuration signals for controlling the imager.

2. A method as claimed in claim 1 which further comprises:
   producing reset counter values to control the reset cycle; and
   producing read counter values to control the read cycle.

3. A method as claimed in claim 2 which further comprises:
   producing a signal for synchronizing the read control signals and the reset control signals.

4. A method as claimed in claim 1 wherein:

$$T_{int} < [(\Delta_{Col} * T_{Col}) + T_{row\_blank} + T_{hblank}] * \Delta_{Row} + T_{vblank},$$

where:
$T_{int}$ is the selected integration time,
$T_{col}$ is the period at which a column or columns are read out,
$T_{row\_blank}$ is the delay time from sampling and latency for a single read,
$T_{hblank}$ is the horizontal blank time,
$T_{vblank}$ is the vertical blank time,
$\Delta_{Col}$ is the number of columns for the selected window size, and
$\Delta_{Row}$ is the number of rows for the selected window size.

5. A method as claimed in claim 4 wherein an optimal $T_{vblank}$ is set for a fixed $T_{hblank}$ to minimize frame time.

6. A method as claimed in claim 4 wherein an optimal $T_{hblank}$ is set for a fixed $T_{vblank}$ to minimize frame time.

7. A method as claimed in claim 4 wherein optimal $T_{vblank}$ and $T_{hblank}$ are set to minimize frame time.

8. A method as claimed in claim 4 wherein $T_{int}$ is smaller than but very nearly equal to $\{[(\Delta_{Col} * T_{Col}) + T_{row\_blank} + T_{hblank}] * \Delta_{Row} + T_{vblank}\}$ to minimize frame time.

9. Apparatus for controlling an imager by automatically setting horizontal blank time for a selected integration time and window size comprising:
   interface means for receiving input signals for a selected integration time and window size, the interface means including a frame calculator for setting the vertical blank time equal to the integration time and calculating the horizontal blank time for the selected integration time or window size, and means for generating configuration signals from the calculated horizontal blank time, the set vertical blank time and the input signals; and
   means for generating reset control signals and read control signals from the configuration signals for controlling the imager.

10. Apparatus as claimed in claim 9 wherein the means for generating reset control signals and read control signals comprises finite state machine means.

11. Apparatus as claimed in claim 10 wherein the finite state machine means comprises:
   a reset finite state machine for producing reset control signals in response to configuration signals; and
   a read finite state machine for producing read control signals in response to the configuration signals.

12. Apparatus as claimed in claim 11 wherein:
   the reset finite state machine comprises:
      means for producing reset control signals; and
      means for producing reset counter values to control the reset cycle;
   the read finite state machine comprises:
      means for producing read control signals; and
      means for producing read counter values to control the read cycle.

13. Apparatus as claimed in claim 12 further comprising means for producing a signal for synchronizing the reset finite state machine and the read finite state machine.

14. Apparatus as claimed in claim 9 wherein:

$$T_{int} < [(\Delta_{Col} * T_{Col}) + T_{row\_blank} + T_{hblank}] * \Delta_{Row} + T_{vblank},$$

where:
$T_{int}$ is the selected integration time,
$T_{col}$ is the period at which a column or columns are read out,
$T_{row\_blank}$ is the delay time from sampling and latency for a single read,
$T_{hblank}$ is the horizontal blank time,
$T_{vblank}$ is the vertical blank time,
$\Delta_{Col}$ is the number of columns for the selected window size, and
$\Delta_{Row}$ is the number of rows for the selected window size.

15. Apparatus as claimed in claim 14 wherein an optimal $T_{vblank}$ is set for a fixed $T_{hblank}$ to minimize frame time.

16. Apparatus as claimed in claim 14 wherein an optimal $T_{hblank}$ is set for a fixed $T_{vblank}$ to minimize frame time.

17. Apparatus as claimed in claim 14 wherein optimal $T_{vblank}$ and $T_{hblank}$ are set to minimize frame time.

18. Apparatus as claimed in claim 14 wherein $T_{int}$ is smaller than but very nearly equal to $\{[(\Delta_{Col} * T_{Col}) + T_{row\_blank} + T_{hblank}] * \Delta_{Row} + T_{vblank}\}$ to minimize frame time.

19. A computer readable memory element storing the instructions or statements for use in the execution in a computer of a method for controlling an imager by automatically setting horizontal blank time for a selected integration time and window size comprising:
   providing a selected integration time and window size;
   setting a vertical blank time equal to the integration time;
   calculating the horizontal blank time for the selected integration time and window size;
   generating configuration signals automatically from the selected integration time, window size, calculated horizontal blank time, and set vertical blank time; and
   generating reset control signals and read control signals from the configuration signals for controlling the imager.

20. A computer readable memory element as claimed in claim 19 wherein the method further comprises:
   producing reset counter values to control the reset cycle; and
   producing read counter values to control the column read cycle.

21. A computer readable memory element as claimed in claim 20 wherein the method further comprises:
   producing a signal for synchronizing the read control signals and the reset control signals.

22. A computer readable memory element as claimed in claim 19 wherein:

$$T_{int} < [(\Delta_{Col} * T_{Col}) + T_{row\_blank} + T_{hblank}] * \Delta_{Row} + T_{vblank},$$

where:
$T_{int}$ is the selected integration time,
$T_{col}$ is the period at which a column or columns are read out,
$T_{row\_blank}$ is the delay time from sampling and latency for a single read,
$T_{hblank}$ is the horizontal blank time,
$T_{vblank}$ is the vertical blank time,
$\Delta_{Col}$ is the number of columns for the selected window size, and
$\Delta_{Row}$ is the number of rows for the selected window size.

23. A computer readable memory element as claimed in claim 22 wherein an optimal $T_{vblank}$ is set for a fixed $T_{hblank}$ to minimize frame time.

24. A computer readable memory element as claimed in claim 22 wherein an optimal $T_{hblank}$ is set for a fixed $T_{vblank}$ to minimize frame time.

25. A computer readable memory element as claimed in claim 22 wherein optimal $T_{vblank}$ and $T_{hblank}$ are set to minimize frame time.

26. A computer readable memory element as claimed in claim 22 wherein $T_{int}$ is smaller than but very nearly equal to $\{[(\Delta_{Col} * T_{Col}) + T_{row\_blank} + T_{hblank}] * \Delta_{Row} + T_{vblank}\}$ to minimize frame time.

* * * * *